United States Patent [19]

Woertz

[11] 4,151,260
[45] Apr. 24, 1979

[54] HYDROGEN SULFIDE ABATEMENT IN GEOTHERMAL STEAM

[75] Inventor: Byron B. Woertz, Claremont, Calif.

[73] Assignee: Union Oil Company of California, Brea, Calif.

[21] Appl. No.: 735,768

[22] Filed: Oct. 26, 1976

[51] Int. Cl.² .................... C01B 17/16; C01B 31/20; F03G 7/02

[52] U.S. Cl. .................. 423/224; 423/210; 423/234; 60/641

[58] Field of Search .................. 166/267, 310; 175/65, 175/66, 71; 60/641; 423/224, 210, 234, 571, 573

[56] References Cited

U.S. PATENT DOCUMENTS

| | | | |
|---|---|---|---|
| 1,854,428 | 4/1932 | Segerfelt | 423/224 |
| 2,472,473 | 6/1949 | Fetterly | 423/573 |
| 2,684,231 | 7/1954 | Pomykala | 423/234 X |
| 3,817,038 | 6/1974 | Paull et al. | 423/210 X |
| 3,867,509 | 2/1975 | Geiger et al. | 423/224 |
| 3,911,080 | 10/1975 | Mehl et al. | 423/210 |
| 3,969,479 | 7/1976 | Lonnes et al. | 423/224 |

OTHER PUBLICATIONS

Castrantas H. M., et al., "Hydrogen Sulfide Abatement at Geothermal Wells," presented at Geothermal Environmental Seminar, sponsored by Lake County, California Air Pollution Control Board, Oct. 28, 1976.

*Primary Examiner*—O. R. Vertiz
*Assistant Examiner*—Gary P. Straub
*Attorney, Agent, or Firm*—Richard C. Hartman; Dean Sandford; Daniel R. Farrell

[57] ABSTRACT

A process for reducing the hydrogen sulfide content of geothermal steam during a drilling operation by injecting hydrogen peroxide and an alkali metal hydroxide or calcium hydroxide into a flowing stream containing geothermal steam. Environmentally harmless reaction products are thus formed and the emission of hydrogen sulfide during drilling operations is substantially abated.

24 Claims, 1 Drawing Figure

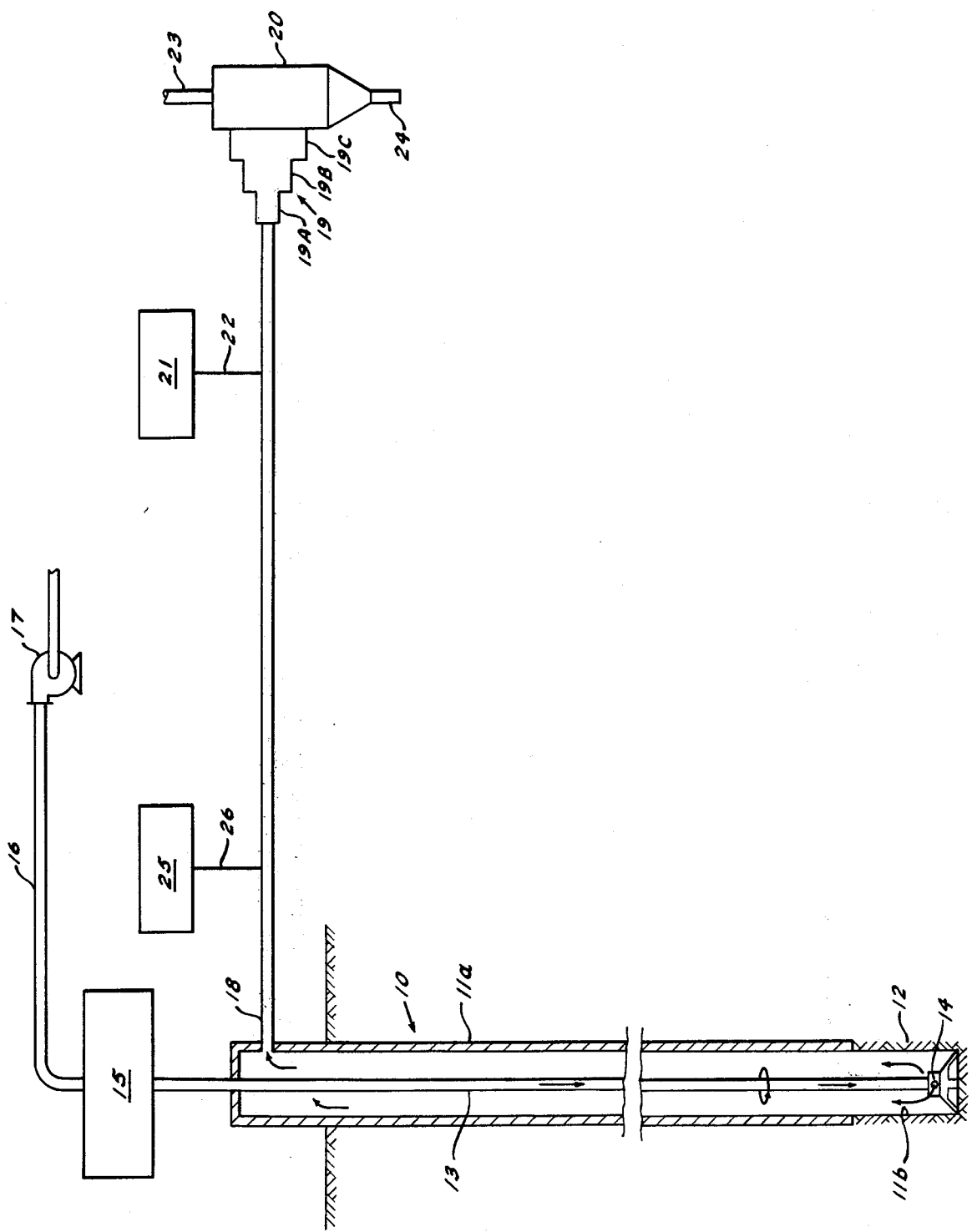

HYDROGEN SULFIDE ABATEMENT IN GEOTHERMAL STEAM

BACKGROUND OF THE INVENTION

This invention relates to the drilling of wells for the production of geothermal steam and more particularly to a method for reducing the hydrogen sulfide content of geothermal steam released during the drilling operation so as to abate the emission of hydrogen sulfide to the environment.

In recent years the harnessing of geothermal energy has become of increasing concern and interest. Typically the geothermal thermal energy is obtained by recovering steam, hot water or hot aqueous brines from underground reservoirs and utilizing the energy values of these hot fluids either directly or indirectly to drive turbines and the like. The hot fluids are normally recovered from the underground reservoir by drilling a well of sufficient depth to penetrate the fluid-bearing portion of the reservoir. During such drilling operations conventional drilling fluids are utilized for removing the cuttings from the well bore. Typically air is utilized as the drilling fluid when the well bore has reached the hot fluid-bearing portion of the reservoir and the returning air, in addition to containing formation cuttings, also contains a substantial amount of steam which escapes from the reservoir during the drilling operation. The returning air and steam is normally led from the well to a separator where the particulate matter is separated from the stream of air and steam and thence the air and steam are discharged to the atmosphere, Geothermal steam typically contains hydrogen sulfide gas which is discharged along with the steam. Consequently the emission of untreated geothermal steam to the atmosphere is undesirable both from the standpoint of health and safety and from the standpoint of the odor of the hydrogen sulfide. However, during the well drilling operation itself, the geothermal steam escaping from the reservoir is conventionally emitted directly to the atmosphere without treatment to remove hydrogen sulfide.

Processes are known in the prior art for the treatment of gas streams to absorb hydrogen sulfide therefrom. For example, it is known that contacting a hydrogen sulfide containing gas stream with an alkaline hydrogen peroxide solution will remove hydrogen sulfide from a gas stream. However, these processes involve the use of packed columns or other gas liquid contact devices which are totally impractical and unsuited for use in well drilling operations of the type described. In addition these processes are not concerned with the treatment of hot fluids having the air-liquid volume ratio of geothermal steam produced during drilling operations.

Accordingly it is an object of the present invention to provide a method for the abatement of hydrogen sulfide discharge into the atmosphere during well drilling operations.

It is another object of the present invention to provide a method for reducing the hydrogen sulfide content of geothermally produced steam by a process which is readily adaptable for use in conventional well drilling operations and which does not substantially hamper or interfere with the well drilling operations.

These and other objects and advantages of the present invention will be apparent from the following detailed description and drawings.

SUMMARY OF THE INVENTION

Briefly the present invention resides in a process for the treatment of geothermal steam during a drilling operation to effect a reduction in the hydrogen sulfide content of the steam and thus an abatement of hydrogen sulfide emission. More particularly the process of the present invention involves contacting the geothermal steam with hydrogen peroxide and an alkaline material and maintaining contact therebetween for a period sufficient to effect a reduction in the hydrogen sulfide content of the steam.

Preferably the contact with the steam occurs in the exhaust conduit through which the steam and returning drilling fluids flow from the well. The process is carried out by forming aqueous solutions of the hydrogen peroxide and alkaline material and injecting these solutions directly into the conduit in the form of a fine mist or spray. The mist is carried along with the steam and is sufficiently agitated by the turbulence of the fluid flow in the conduit to effect intimate contact with the hydrogen sulfide of the steam. Reactions between the hydrogen sulfide, the hydrogen peroxide and the alkaline material occur in the conduit and result in the reaction of the hydrogen sulfide to form environmentally harmless reaction products which can be discharged without detrimental effect on the environment.

BRIEF DESCRIPTION OF THE DRAWINGS

The drawing is a schematic representation of a well drilling operation illustrating the circulation system for drilling fluids and means for treating fluids exiting during the drilling operation.

DESCRIPTION OF THE PREFERRED EMBODIMENT

Referring to the drawing, there is shown a well, indicated generally as 10, which includes an upper cased portion 11a and a lower uncased portion 11b which penetrates a geothermal steam-containing formation 12. A rotary drill string 13 extends through the bore of the well 10 and carries at its lower end a drilling bit 14 which drills in the uncased lower portion 11b of the well. The rotary equipment is standard and includes a rotary table 15 and a standpipe 16 which communicates with the drill string 13 for the circulation of a drilling fluid by means of a pump 17 connected to a source of the drilling fluid, not shown. The circulating drilling fluid is pumped down through the drill string 13 and up through the annular portion of the bore hole surrounding the drill string as shown by the arrows. The circulating drilling fluid carries the cuttings from the well and the circulation rate is adjusted to sufficient velocity to permit the drilling fluid to entrain and carry the bore hole cuttings produced during the drilling operation. The drilling fluid and cuttings exit the well 10 and travel through a conduit 18 to a "blooie" line, shown generally as 19 which communicates with a muffler/separator 20. The "blooie" line consists of three sections, 19A, 19B and 19C each of the sections being of increasing internal diameter so as to permit the drilling fluid to expand as it passes through the "blooie" line to the muffler/separator 20. In accordance with standard practice water is introduced into the flow conduit 18 from a reservoir tank 21 by means of a line 22 communicating between the conduit and the tank. The water wets the entrained cuttings which aids in their separation from the fluid portions in the muffler/separator 20.

The noncondensable portions exit the muffler/separator 20 at an exhaust line 23 and the cuttings and condensable portions are removed by means of drain line 24 which is provided with a shutoff valve of conventional design, not shown.

In accordance with standard practice, conventional drilling muds may be utilized as the drilling fluids during the initial stages of the drilling operation. However, as the steam-bearing portion of the reservoir is reached it is highly preferred that the drilling fluid be a gaseous substance, conventionally air. In certain cases it may be desirable to provide a closed system whereby the noncondensable gases exiting the muffler/separator 20 through the exhaust line 23 are led back to the well 10 through the pump 17 and the standpipe 16 by a connecting line, not shown.

As drilling continues into the steam-bearing portion of the formation 12, a certain amount of steam will be released and will be carried out of the well along with the circulating drilling fluid. The geothermal steam contains, in a typical case, on the order of 130 to about 300 ppm of hydrogen sulfide gas and the hydrogen sulfide will be passed out of the muffler/separator 20 along with the noncondensed gases through the exhaust line 23. Typically the noncondensed gases are exhausted directly to the atmosphere and consequently a substantial portion of the hydrogen sulfide will also be emitted. This emission of hydrogen sulfide constitutes an environmental problem both as a source of obnoxious odors and, depending on its concentration, a health and safety hazard.

In accordance with the present invention hydrogen peroxide and an alkaline material are led from a tank 25 through a line 26 into contact with the steam in the conduit 18 to serve as reagents to lower the hydrogen sulfide content of the steam. It is important that the reagents be thoroughly mixed with the fluid in conduit 18 to insure sufficient contact with the steam, particularly the condensed fluids in which a substantial portion of the hydrogen sulfide is contained. This mixing or agitation can be accomplished by inducing a pressure drop in the conduit 18, such as by a venturi tube. Preferably, however, pressure drops in the conduit 18 are to be avoided and mixing is accomplished by passing the fluid through the conduit 18 at a sufficient rate to induce turbulence in the flowing stream which will result in the mixing of the fluid and the reagents. In addition, contact between the steam and the reagents is further enhanced by introducing the hydrogen peroxide and alkaline material through a suitable nozzle in the wall of the conduit 18 as a fine spray or mist. As a consequence the reagents are intimately mixed with the fluid stream flowing through the conduit 18 to accomplish the desired contact and the contact is maintained for sufficient period to accomplish a reduction in the hydrogen sulfide content of the geothermal steam. In the preferred embodiment, the hydrogen peroxide and the alkaline material are premixed in an aqueous solution so that only a single injection is required. However, solutions of the hydrogen peroxide and the alkaline material may be separately introduced into the conduit 18 with good results although this requires additional equipment.

Preferably the hydrogen peroxide and the alkaline material are brought into contact with the steam in the conduit 18 at a point as close to the well head as is convenient without interfering with the drilling operations. This permits the maximum amount of residence contact time between the steam, hydrogen peroxide and alkaline material before the conduit reaches the "blooie" line 19 and the muffler/separator 20.

In considering the process of the present invention it is believed that the reduction in hydrogen sulfide content occurs in accordance with the following general formulas:

$$H_2S + 2OH^- \rightarrow 2 HOH + S^= \quad (1)$$

$$4 H_2O_2 + S^= \rightarrow 4 HOH + SO_4^= \quad (2)$$

Although it is not completely understood, it is believed that at the reaction temperatures involved in the present process, on the order of 180° F. and greater, a substantial portion of the hydrogen sulfide content of the steam is in a noncondensed, vapor phase. When contacted with the alkaline material and the hydrogen peroxide in aqueous solution, the hydrogen sulfide reacts with the alkaline material to form a sulfide which is transferred from the vapor phase to the liquid phase. In the liquid phase, the sulfide more readily contacts the hydrogen peroxide which is concentrated in the liquid phase at the temperatures typically encountered in the conduit 18. The sulfide is oxidized by the hydrogen peroxide to a sulfate in accordance with formula (2).

The alkaline material utilized in the process is selected from an alkali metal hydroxide, calcium hydroxide or sodium peroxide which are of sufficient alkalinity to solubilize the sulfide. Taking the alkali metal cation sodium for example the reaction (1) is written as follows:

$$H_2S + 2NaOH \rightarrow 2 HOH + Na_2S \quad (3)$$

Sodium sulfide is readily solubilized in the liquid phase and thus contacts the hydrogen peroxide in the liquid phase to form water and sodium sulfate according to the reaction:

$$Na_2S + 4 H_2O_2 \rightarrow 4 HOH + Na_2SO_4 \quad (4)$$

In addition there is some direct reaction between the hydrogen sulfide and hydrogen peroxide to form water and sulfuric acid in accordance with formula (2).

The reaction products formed in the present process are environmentally harmless. By environmentally harmless it is meant that the effect of the reaction products on the environment, particularly as diluted in the condensed liquid phase of fluid in the conduit 18, is such that they can be discharged with the liquid phase without endangering the health of persons and wildlife in the vicinity or otherwise creating a nuisance, such as creating obnoxious odors in the vicinity of the drilling operation. Likewise, the noncondensed phase is substantially depleted of hydrogen sulfide and can be discharged to the atmosphere without substantial hydrogen sulfide emission.

The relative proportions of hydrogen peroxide and alkaline material utilized in the process can be varied widely depending upon the percentage of hydrogen sulfide abatement it is desired to achieve. Abatements in hydrogen sulfide emissions in excess of 50% are achieved when the molar ratio of hydrogen peroxide/alkaline material/hydrogen sulfide is on the order of 3:1:1. However, it is highly preferred to achieve at least about an 85% abatement in hydrogen sulfide emissions and it is found that this is accomplished when the molar ratio of the hydrogen peroxide and the alkaline material per mol of hydrogen sulfide is at least the stoichiometric amount of hydrogen peroxide and alkaline material as set forth in formulas 1-4 above. Accordingly it is preferred that the hydrogen peroxide/alkaline material/$H_2S$ molar ratio be at least about 4:2:1 when using an alkali metal hydroxide and 4:1:1 when using calcium hydroxide. Best results are achieved, however, utilizing an excess of hydrogen peroxide and alkaline material over the stoichiometric amount. It is believed that this is due to the fact that geothermal steam, in addition to containing hydrogen sulfide, contains amounts of carbon dioxide which reacts with the alkaline material to consume the reagent without any reduction in hydrogen sulfide content. Also, hydrogen peroxide will react with iron present in the steam from the drilling equipment and the like, to produce iron oxide and water. Moreover, hydrogen peroxide itself will undergo some decomposition. These factors all combine to consume reagents without reducing the hydrogen sulfide content of the steam and accordingly best results are achieved by utilizing amounts of hydrogen peroxide and alkaline material in excess of the stoichiometric amount required to react with the hydrogen sulfide.

The alkaline material is selected from the hydroxides of the alkali metals or calcium hydroxide. These materials are sufficiently alkaline to solubilize the hydrogen sulfide in accordance with the reactions set out above and in addition are relatively inexpensive materials so as not to detract from the economy of the process. The preferred alkaline materials are sodium or potassium hydroxide since these materials are readily available and will produce highly soluble sulfides which can readily react with the hydrogen peroxide contained in the liquid phase. However, lithium hydroxide, although somewhat more expensive, is equally suitable for use in the process. Calcium hydroxide can also be employed although it is not preferred because it may react with carbon dioxide to form calcium carbonate which may build up in the conduit 18. As mentioned above it is preferred, in preparing the hydrogen peroxide and the alkaline material for use in the present invention, to mix the two reagents into a single solution for contact with the steam. The solution is readily prepared by admixing up to about 50 wt.% of the alkaline material with a 35% aqueous solution of hydrogen peroxide. In view of the fact it is highly preferred to contact the steam with the reagents in the form of a fine spray it is desirable that the solution of alkaline material be on the order of about 10 wt.% to about 15 wt.% in order that the reagent solution be less viscous and more readily formed into a fine spray or mist.

Likewise, the hydrogen peroxide solution is on the order of 35% or less of hydrogen peroxide. Although more concentrated solutions are available they are not preferred because of the instability of the more concentrated hydrogen peroxide.

The following examples are by way of illustration of a preferred embodiment of the present invention.

EXAMPLE

A field test was conducted to demonstate the abatement in the emission of hydrogen sulfide by contacting geothermal steam containing hydrogen sulfide with hydrogen peroxide and sodium hydroxide. The geothermal steam was obtained from a producing well and the steam was led through a 2-inch diameter line approximately 34 feet long which communicated with a 16-inch diameter cyclonic muffler/separator by means of a 3-section "blooie" line comprising a first 2-foot section of a 2-inch diameter, a second 1-foot section of 5-inch diameter and a third one-foot section of a 6.5-inch diameter. The line was adapted for injection of aqueous solutions of hydrogen peroxide and sodium hydroxide by the provision of an injection coupling and nozzle in the line approximately 8 feet downstream from the source of the steam and approximately 24 feet upstream of the "blooie" line. The reagent solution was injected into the line using a chemical feeder piston pump having an adjustable stroke which is preset so that the reagents were introduced at a rate to provide a known molar ratio of $H_2O_2$:NaOH:$H_2S$ depending upon the flow rate of the fluids through the line. A venturi tube having a ¼-inch pipe nipple is installed downstream of the injection couplings to provide agitation of the steam and injected solution.

The tests were conducted by preparing stock solutions of a 35% aqueous solution of hydrogen peroxide and a 12 wt.% aqueous solution of sodium hydroxide. Varying amounts of the stock solutions were premixed with additional water to provide a total charge of approximately 2950 ml and the solution introduced into the line through the injection coupling and nozzle at a predetermined rate in ml/min to provide a desired ratio of hydrogen peroxide/sodium hydroxide/hydrogen sulfide. In addition tests were conducted using only sodium hydroxide and only hydrogen peroxide as the reagent for reducing the hydrogen sulfide content of the steam.

Geothermal steam having an $H_2S$ content of about 382 ppm was passed through the line at a rate of about 100 lb/hr. The charge was metered into the line for a period of 15 minutes whereupon samples were taken of the noncondensed gases and the condensed liquids from the muffler/separator. Contact time between the steam and reagents was about 0.7 sec. The tests are summarized in Table A below.

TABLE A

| Example | Solution Composition, Ml | | | Solution Charge Rate ml/min | Steam Flow, lb/hr | Approximate Mol Ratio $H_2O_2$/NaOH/$H_2S$ | % Abatement $H_2S$ |
|---|---|---|---|---|---|---|---|
| | $H_2O_2$[1] | NaOH[2] | $H_2O$ | | | | |
| 1 | 363 | 120 | 2467 | 120 | 102 | 20:2:1 | 84 |
| 2 | 90 | 120 | 2739 | 82 | 93 | 4:1:1 | 84 |
| 3 | 45.4 | 120 | 2784 | 82 | 93 | 2:1:1 | 66 |
| 4 | 68 | 120 | 2762 | 82 | 93 | 3:1:1 | 61 |
| 5 | 90.8 | 60 | 2799 | 83 | 102 | 3:0.6:1 | 55 |
| 6 | 90.8 | 240 | 2619 | 120 | 102 | 5:3:1 | 88 |
| 7 | 90.8 | 240 | 2619 | 96.5 | 102 | 4:3:1 | 80 |
| 8 | 90.8 | 240 | 2619 | 186 | 102 | 8:5:1 | 92 |
| 9 | 363 | — | 2586 | 125 | 92 | 21:0:1 | 22 |
| 10 | 1000 | — | — | 215 | 92 | 287:0:1 | 45 |
| 11 | — | 120 | 2830 | 82 | 102 | 0:1:1 | 52 |

TABLE A-continued

| Example | Solution Composition, Ml | | | Solution Charge Rate ml/min | Steam Flow, lb/hr | Approximate Mol Ratio $H_2O_2$/NaOH/$H_2S$ | % Abatement $H_2S$ |
|---|---|---|---|---|---|---|---|
| | $H_2O_2$[1] | NaOH[2] | $H_2O$ | | | | |
| 12 | — | 360 | 2635 | 83 | 102 | 0:3.5:1 | 67 |

[1] 35% $H_2O_2$ in Water
[2] 12% by Wt. NaOH in Water

In the Examples summarized in Table A above the hydrogen sulfide in the emission steam was determined using a Drager tube comprising a bellows and glass suction tube which is filled with a reagent for detecting hydrogen sulfide. The glass suction tube is inserted in the emission stream and the bellows allowed to expand thereby drawing a sample of the gas stream through the tube. This device is manufactured by Dragerwerk A.G., Lubeck, Germany.

Samples of condensate were periodically withdrawn from the lower portion of the muffler/separator and tested for sulfide and hydrogen peroxide content. In the tests represented by Examples 1-8, the sulfide content was generally less than 0.1 ppm Likewise the hydrogen peroxide content of the condensate never exceeded more than trace quantities.

From Table A above it can be seen that abatement in excess of 50% of the hydrogen sulfide content of the geothermal gas is achieved utilizing a mixture of hydrogen peroxide and sodium hydroxide in proportions such that the molar ratio of either or both the hydrogen peroxide and the sodium hydroxide per mol of hydrogen sulfide are less than the stoichiometric molar ratios. However, a reduction in the hydrogen sulfide emission of on the order of 80% or greater is achieved when the proportion of hydrogen peroxide is at least the stoichiometric proportion required to react with the hydrogen sulfide in the steam. Best results are achieved, however, when both the hydrogen peroxide and the sodium hydroxide are present in amounts in excess of the stoichiometric amount required to react with the hydrogen sulfide content of the geothermal steam.

While in the preferred embodiment the alkaline material has been described in connection with the alkali metal hydroxide and calcium hydroxide it should be understood that sodium peroxide is also suitable for use, alone or in combination with hydrogen peroxide, in the process. Sodium peroxide behaves as an alkaline hydrogen peroxide solution in dilute aqueous solution and is believed to form 2 mols of sodium hydroxide and 1 mol of hydrogen peroxide. Consequently it is preferred to employ sodium peroxide as the alkaline material in combination with hydrogen peroxide to provide molar proportions of reagents equal to or in excess of their stoichiometric proportions.

From the foregoing it will be seen how the present invention provides a process for the treatment of geothermal steam to lower hydrogen sulfide content thereof and to form environmentally harmless reaction products. The present invention is adapted for use in drilling operations when geothermal steam is normally vented to the atmosphere and is suitable for use with conventional drilling equipment with a minimum of equipment modification and expense. In addition, by utilizing an alkaline material along with hydrogen peroxide in the treatment of the geothermal steam, the deleterious effects of the normally corrosive hydrogen peroxide are modified somewhat by the alkaline material and corrosion of the lines and pipes downstream of the injection point is substantially reduced.

I claim:

1. In a drilling operation to form a well, a process for the treatment of geothermal steam produced during the drilling operation to effect an abatement of the emission of hydrogen sulfide contained in said steam, the process comprising:
   flowing said produced geothermal steam through a conduit communicating the well and the atmosphere;
   injecting into said produced geothermal steam flowing through said conduit hydrogen peroxide and an alkaline material selected from the group consisting of the alkali metal hydroxides and calcium hydroxide;
   maintaining said hydrogen peroxide and alkaline material in contact with said steam for a sufficient period to effect a reduction in the hydrogen sulfide content of said steam and to form environmentally harmless reaction products; and
   thereafter discharging said steam and said reaction products to the atmosphere.

2. The process of claim 1 wherein said hydrogen peroxide and said alkaline material are injected into said steam by spraying.

3. The process of claim 1 wherein said hydrogen peroxide and said alkaline material are combined in an aqueous solution prior to injection into said steam.

4. The process of claim 1 wherein aqueous solutions of said hydrogen peroxide and said alkaline material are separately injected into said steam.

5. The process of claim 1 wherein said alkaline material is selected from the group consisting of sodium hydroxide, potassium hydroxide and lithium hydroxide.

6. The process of claim 1 wherein said alkaline material is calcium hydroxide.

7. The process of claim 1 wherein at least one of said hydrogen peroxide and said alkaline material is present in contact with said steam in at least the stoichiometric amount required to react with the hydrogen sulfide of said steam.

8. The process of claim 1 wherein both said hydrogen peroxide and said alkaline material are present in contact with said steam in at least the stoichiometric amount required to react with the hydrogen sulfide of said steam.

9. The process of claim 1 wherein the molar ratio of said hydrogen peroxide and said alkaline material to hydrogen sulfide is at least 4:1:1.

10. The process of claim 1 wherein the molar ratio of said hydrogen peroxide and alkaline material to said hydrogen sulfide lies between 5:3:1 and 8:5:1.

11. The process of claim 1 wherein the molar ratio of said hydrogen peroxide and alkaline material to said hydrogen sulfide is 20:2:1.

12. The process of claim 1 wherein the geothermal steam is flowing through said conduit at a velocity sufficient to create turbulent flow.

13. In a drilling operation to form a well, a process for the treatment of geothermal steam produced during the drilling operation to effect an abatement of the emission of hydrogen sulfide contained in said steam, the process comprising:

flowing said produced geothermal steam through a conduit communicating the well and the atmosphere;

injecting into said produced geothermal steam flowing through said conduit an aqueous solution of hydrogen peroxide and an aqueous solution of alkaline material selected from the group consisting of the alkali metal hydroxides and calcium hydroxide, said hydrogen peroxide and said alkaline material being present in at least the stoichiometric amount required to react with the hydrogen sulfide of said steam;

maintaining said hydrogen peroxide and alkaline material in contact with said steam for a sufficient period to effect a substantial reduction in the hydrogen sulfide content of said steam and to form environmentally harmless reaction products; and thereafter discharging said steam and said reaction products to the atmosphere.

14. The process of claim 13 wherein said aqueous solutions are injected into said geothermal steam at a rate sufficient to provide a molar ratio of hydrogen peroxide to alkali metal hydroxide per mol of hydrogen sulfide in said steam of at least 4:1:1.

15. The process of claim 13 wherein the molar ratio of said hydrogen peroxide to alkali metal hydroxide per mol of hydrogen sulfide in said steam ranges between 4:2:1 and 8:5:1.

16. The process of claim 13 wherein said alkali metal hydroxide is sodium hydroxide.

17. The process of claim 13 wherein the combined aqueous solution is an aqueous solution of sodium peroxide.

18. The process of claim 13 wherein the combined aqueous solution is an aqueous solution of hydrogen peroxide and sodium peroxide.

19. The process of claim 12 wherein said aqueous solution of hydrogen peroxide and said aqueous solution of an alkaline material are combined prior to injection into said steam.

20. The process of claim 13 wherein said aqueous solution of hydrogen peroxide and said aqueous solution of an alkaline material are injected into said steam by spraying.

21. The process of claim 13 wherein the produced geothermal steam is flowing through said conduit at a velocity sufficient to create turbulent flow.

22. In a drilling operation to form a well, a process for the treatment of geothermal steam produced during the drilling operation to effect an abatement of the emission of hydrogen sulfide contained in said steam, the process comprising:

passing said geothermal steam through a conduit communicating the well and the atmosphere at a velocity sufficient to create turbulent flow;

separately spraying into contact with said flowing steam a first aqueous solution of hydrogen peroxide and a second aqueous solution of an alkali metal hydroxide, said hydrogen peroxide and said alkali metal hydroxide being present in at least the stoichiometric amount required to react with the hydrogen sulfide contained in said steam;

maintaining said hydrogen peroxide and alkali metal hydroxide in contact with said steam for a sufficient period to effect a substantial reduction in the hydrogen sulfide content of said steam and to form environmentally harmless reaction products; and thereafter discharging said steam and said reaction products to the atmosphere.

23. The process of claim 22 wherein said aqueous solutions are injected into said geothermal steam at a rate sufficient to provide a molar ratio of hydrogen peroxide to alkali metal hydroxide per mol of hydrogen sulfide in said steam of at least 4:1:1.

24. The process of claim 23 wherein the molar ratio of said hydrogen peroxide to alkali metal hydroxide per mol of hydrogen sulfide in said steam is between about 4:2:1 and about 8:5:1.

* * * * *

UNITED STATES PATENT AND TRADEMARK OFFICE
CERTIFICATE OF CORRECTION

PATENT NO. : 4,151,260
DATED : April 24, 1979
INVENTOR(S) : BYRON B. WOERTZ

It is certified that error appears in the above-identified patent and that said Letters Patent are hereby corrected as shown below:

In column 9, (claim 17) line 34, change "13" to read --19--.

In column 9, (claim 18) line 37, change "13" to read --19--.

In column 9, (claim 19) line 40, change "12" to read --13--.

In column 10, starting at line 41, insert the following claims:

25. A process for removing hydrogen sulfide from geothermal steam which comprises passing geothermal steam containing hydrogen sulfide through a conduit and introducing into said conduit an alkaline acting reagent and an inorganic oxidizing agent under conditions to effect a reduction in the hydrogen sulfide content of said steam.

On The Title Page:

"24 Claims" should read -- 25 Claims --.

Signed and Sealed this

Ninth Day of June 1981

[SEAL]

Attest:

RENE D. TEGTMEYER

Attesting Officer     Acting Commissioner of Patents and Trademarks

Notice of Adverse Decision in Interference

In Interference No. 100,265, involving Patent No. 4,151,260, B. Woertz, HYDROGEN SULFIDE ABATEMENT IN GEOTHERMAL STEAM, final judgment adverse to the patentee was rendered Oct. 24, 1984, as to claim 25.
[*Official Gazette April 30, 1985.*]